United States Patent
Andersen et al.

(10) Patent No.: US 6,940,185 B2
(45) Date of Patent: Sep. 6, 2005

(54) ADVANCED AERODYNAMIC CONTROL SYSTEM FOR A HIGH OUTPUT WIND TURBINE

(75) Inventors: Stephen M. Andersen, Elkton, MD (US); Kenneth L. Laubsch, Bridgeton, NJ (US); Steven R. Kopf, Landenburg, PA (US); Brock J. Vinton, II, Wilmington, DE (US); Peter Jamieson, Glasgow (GB)

(73) Assignee: Advantek LLC, Boothwyn, PA (US)

( * ) Notice: Subject to any disclaimer, the term of this patent is extended or adjusted under 35 U.S.C. 154(b) by 151 days.

(21) Appl. No.: 10/410,847

(22) Filed: Apr. 10, 2003

(65) Prior Publication Data

US 2004/0201220 A1 Oct. 14, 2004

(51) Int. Cl.[7] .............................. F03D 9/00; F03D 7/00; F03D 3/00; H02P 9/04
(52) U.S. Cl. ............................. 290/44; 290/55; 415/907
(58) Field of Search ................... 290/44, 55; 415/7, 415/2.1, 4.2, 907, 11; 60/641.12, 641.11; 416/31, 1

(56) References Cited

U.S. PATENT DOCUMENTS

| | | | |
|---|---|---|---|
| 1,300,552 A | * | 4/1919 | Barr .............................. 416/91 |
| 2,157,281 A | * | 5/1939 | Coanda ......................... 244/15 |
| 3,326,296 A | * | 6/1967 | Hill et al. ...................... 416/92 |
| 3,830,450 A | | 8/1974 | Williams et al. |
| 3,934,410 A | * | 1/1976 | Williams ...................... 60/269 |
| 4,045,144 A | | 8/1977 | Loth |
| 4,197,053 A | * | 4/1980 | Reinke .......................... 416/91 |
| 4,228,753 A | * | 10/1980 | Davis et al. ............... 114/67 A |
| 4,366,386 A | | 12/1982 | Hanson |
| 4,504,192 A | | 3/1985 | Cyrus et al. |
| 4,530,642 A | | 7/1985 | Yang |
| 4,555,079 A | * | 11/1985 | Harvell et al. ............... 244/207 |
| 4,648,801 A | * | 3/1987 | Wilson ........................ 416/171 |
| 4,692,095 A | | 9/1987 | Lawson-Tancred |
| 4,792,700 A | | 12/1988 | Ammons |
| 5,083,039 A | | 1/1992 | Richardson et al. |
| 5,083,901 A | * | 1/1992 | Griffin et al. .................. 416/87 |

(Continued)

FOREIGN PATENT DOCUMENTS

| | | |
|---|---|---|
| DE | 198 47 982 A1 | 6/1999 |
| FR | 2 589 423 A1 | 7/1987 |
| GB | 2067247 A | 7/1981 |
| GB | 2185788 A | 7/1987 |
| GB | 2186033 A * | 8/1987 |
| WO | WO 01/33075 A1 | 5/2001 |

OTHER PUBLICATIONS

Jef Raskin, "Coanda Effect: Understanding Why Wings Work", Jef Raskins Webpage (www.jefraskin.com), Dec. 21, 2001.

Primary Examiner—Nicholas Ponomarenko
Assistant Examiner—Julio C. Gonzalez
(74) Attorney, Agent, or Firm—Akin Gump Strauss Hauer & Feld, LLP

(57) ABSTRACT

An advanced aerodynamic control system for a wind turbine including a drive shaft and blade. The control system includes an air control system coupled to a duct that extends from a first end toward a second end of the blade. A slot extends along a portion of a surface of the blade and is in communication with the duct. An instrument measures operating data of the wind turbine. A controller collects the operating data and compares the operating data to predetermined operating norms. The controller actuates the air control system to urge pressurized air into the duct and out of the slot at a specific air flow rate based upon the comparison between the operating data and predetermined operating norms. Control of the flow rate aids in capture of power from the wind flowing through a swept area of the wind turbine.

16 Claims, 8 Drawing Sheets

U.S. PATENT DOCUMENTS

| | | | |
|---|---|---|---|
| 5,106,265 A | * | 4/1992 | Holzem ........................ 416/23 |
| 5,155,375 A | | 10/1992 | Holley |
| 5,289,041 A | * | 2/1994 | Holley ........................ 290/44 |
| 5,464,321 A | * | 11/1995 | Williams et al. .......... 416/93 A |
| 5,506,453 A | | 4/1996 | McCombs |
| 5,791,601 A | * | 8/1998 | Dancila et al. ............. 244/207 |
| 5,907,192 A | * | 5/1999 | Lyons et al. ................... 290/44 |
| 6,053,700 A | | 4/2000 | Fosdick |
| 6,441,507 B1 | * | 8/2002 | Deering et al. ............... 290/44 |
| 6,619,918 B1 | * | 9/2003 | Rebsdorf ....................... 416/1 |
| 2004/0070210 A1 | * | 4/2004 | Johansen et al. ............. 290/43 |

* cited by examiner

| Wind Speed | Net Power | Generator Power | Thrust | Pressure | Pitch | Mass Flow Rate (All Blades) | Jet Power (All Blades) |
|---|---|---|---|---|---|---|---|
| [m/s] | [W] | [W] | [N] | [Pa] | [deg] | [kg/s] | [W] |
| 5 | 824 | 2168 | 1191 | 1381 | 0.00 | 0.602 | 960 |
| 5.5 | 1967 | 3502 | 1471 | 1525 | 0.00 | 0.623 | 1535 |
| 6 | 3296 | 5006 | 1746 | 1653 | 0.00 | 0.641 | 1711 |
| 6.5 | 4813 | 6872 | 2097 | 1897 | 0.00 | 0.673 | 2059 |
| 7 | 6429 | 8956 | 2480 | 2204 | 0.00 | 0.712 | 2527 |
| 7.5 | 8226 | 11316 | 2879 | 2550 | 0.00 | 0.753 | 3090 |
| 8 | 10222 | 13918 | 3273 | 2901 | 0.00 | 0.792 | 3696 |
| 8.5 | 12222 | 15543 | 3295 | 2687 | 0.00 | 0.769 | 3321 |
| 9 | 13932 | 16886 | 3296 | 2468 | 0.07 | 0.743 | 2954 |
| 9.5 | 15315 | 18192 | 3296 | 2421 | 0.63 | 0.738 | 2877 |
| 10 | 16000 | 18983 | 3100 | 2486 | 3.40 | 0.745 | 2983 |
| 10.5 | 16000 | 18983 | 2858 | 2486 | 5.74 | 0.745 | 2983 |
| 11 | 16000 | 18983 | 2680 | 2486 | 7.57 | 0.745 | 2983 |
| 11.5 | 16000 | 18983 | 2535 | 2486 | 9.11 | 0.745 | 2983 |
| 12 | 16000 | 18983 | 2412 | 2486 | 10.51 | 0.745 | 2983 |
| 12.5 | 16000 | 18983 | 2307 | 2486 | 11.78 | 0.745 | 2983 |
| 13 | 16000 | 18983 | 2216 | 2486 | 12.95 | 0.745 | 2983 |
| 13.5 | 16000 | 18983 | 2132 | 2486 | 14.07 | 0.745 | 2983 |
| 14 | 16000 | 18983 | 2060 | 2486 | 15.13 | 0.745 | 2983 |
| 14.5 | 16000 | 18983 | 1994 | 2486 | 16.14 | 0.745 | 2983 |
| 15 | 16000 | 18983 | 1936 | 2486 | 17.11 | 0.745 | 2983 |
| 15.5 | 16000 | 18983 | 1881 | 2486 | 18.04 | 0.745 | 2983 |
| 16 | 16000 | 18983 | 1832 | 2486 | 18.94 | 0.745 | 2983 |
| 16.5 | 16000 | 18983 | 1788 | 2486 | 19.79 | 0.745 | 2983 |
| 17 | 16000 | 18983 | 1747 | 2486 | 20.63 | 0.745 | 2983 |
| 17.5 | 16000 | 18983 | 1709 | 2486 | 21.43 | 0.745 | 2983 |
| 18 | 16000 | 18983 | 1675 | 2486 | 22.21 | 0.745 | 2983 |
| 18.5 | 16000 | 18983 | 1643 | 2486 | 22.97 | 0.745 | 2983 |
| 19 | 16000 | 18983 | 1614 | 2486 | 23.71 | 0.745 | 2983 |
| 19.5 | 16000 | 18983 | 1587 | 2486 | 24.43 | 0.745 | 2983 |
| 20 | 16000 | 18983 | 1559 | 2486 | 25.14 | 0.745 | 2983 |
| 20.5 | 16000 | 18983 | 1538 | 2486 | 25.81 | 0.745 | 2983 |
| 21 | 16000 | 18983 | 1517 | 2486 | 26.47 | 0.745 | 2983 |
| 21.5 | 16000 | 18983 | 1497 | 2486 | 27.12 | 0.745 | 2983 |
| 22 | 16000 | 18983 | 1479 | 2486 | 27.75 | 0.745 | 2983 |
| 22.5 | 16000 | 18983 | 1463 | 2486 | 28.36 | 0.745 | 2983 |
| 23 | 16000 | 18983 | 1448 | 2486 | 28.95 | 0.745 | 2983 |
| 23.5 | 16000 | 18983 | 1435 | 2486 | 29.54 | 0.745 | 2983 |
| 24 | 16000 | 18983 | 1422 | 2486 | 30.11 | 0.745 | 2983 |
| 24.5 | 16000 | 18983 | 1412 | 2486 | 30.66 | 0.745 | 2983 |
| 25 | 16000 | 18983 | 1402 | 2486 | 31.20 | 0.745 | 2983 |
| 25.5 | 16000 | 18983 | 1393 | 2486 | 31.73 | 0.745 | 2983 |
| 26 | 16000 | 18983 | 1386 | 2486 | 32.25 | 0.745 | 2983 |

*FIG. 9*

ADVANCED AERODYNAMIC CONTROL SYSTEM FOR A HIGH OUTPUT WIND TURBINE

BACKGROUND OF THE INVENTION

People have been harnessing wind energy for over seven thousand years to propel boats, pump water, process foodstuffs and produce electricity, among other things. Research and development related to the harnessing of wind energy has increased the amount of energy that may be harnessed from the wind in a specific area and/or has reduced the costs associated with harnessing the energy when compared to the amount of wind energy harnessed. Generally, the most common modern method of harnessing wind energy is the production of electrical energy utilizing a wind turbine.

Modern wind turbines are designed to produce a maximum amount of electrical energy at the lowest possible cost in a particular geographical area. The costs associated with a wind turbine can generally be divided into acquisition costs and life cycle costs, of which, acquisition costs are generally significantly higher. Portions of the cost and performance of a wind turbine are apportioned into some type of control system that controls the operation of the wind turbine at high wind speeds to prevent structural damage to the wind turbine structure and at lower wind speeds to maximize the energy extracted from the wind. Modern wind turbines are generally controlled in high and low winds by either a pitch control system or a passive stall control system.

Referring to FIGS. 1 and 7, prior art wind turbines 10' utilizing the stall control system include turbine blades 14' that have a specific chord to thickness ratio and a shape that is optimized to extract a maximum amount of energy from a specific optimum wind speed range 60' that passes by the blades 14' and through a swept area A' of the blades 14'. The shape of the blades 14' may be based, at least partially, on the wind conditions at the geographic location of the wind turbine 10'. The prior art turbine blades 14' that utilize the stall control system have been optimized to extract a near theoretical maximum amount of energy from wind that passes through the swept area A' within the optimum wind speed range 60'. During high speed wind conditions or highly variable wind conditions, the blades 14' are designed to stall to avoid structural damage to the blades 14' and/or drive train of the wind turbine 10'.

The stall control wind turbine 10' is designed to stall to avoid excessive structural loading on the drive train and blades 14' and to be shutdown in wind speeds that exceed a shutdown wind speed 50' (see also FIG. 8). The stall and shutdown conditions of the wind turbine 10' are undesirable because the wind turbine 10' either is not efficiently generating power in variable wind conditions or stops generating power, thereby resulting in lost revenue and/or interruption in power production.

The stall control system is generally utilized because of its simplicity and low acquisition costs. However, stall control wind turbines 10' generally do not operate efficiently, or at all, in highly variable wind speeds and/or wind speeds outside of the optimum wind speed range 60'. Further, the stall controlled wind turbine 10' is subjected to high structural loads during highly variable wind speeds, which may damage the wind turbine 10' and/or cause fatigue problems in structural components of the wind turbine 10'.

Alternative to the stall control wind turbines 10', a pitch controlled wind turbine 10' may be utilized to extract energy from the wind. The pitch controlled wind turbines 10' are generally well known in the art and employ a pitch control system that adjusts a pitch angle of the blades 14' to optimize the energy production of the wind turbine 10'. The pitch control system permits adjustments to the pitch of the blades 14' to optimize the lift of the blades 14' by setting the pitch of the blade 14' at an optimum position relative to a wind blowing in a specific direction at various speeds through the swept area A'. Altering the pitch of the blades 14' to control the lift characteristics permits the pitch controlled wind turbine 10' to operate more efficiently in variable wind speeds and to generally operate in a slightly greater optimum wind speed range 60' than the stall controlled wind turbines 10'. However, pitch control wind turbines 10' generally have a slow rate of response to highly variable wind speeds and directions. In addition, the pitch control wind turbines 10', similar to the stall controlled wind turbines 10', are limited by the above-described structural load considerations. The structural load considerations may limit the length L' of the blades 14' and the optimum wind speed range 60' that the pitch control wind turbine 10' may operate in. Accordingly, the pitch controlled wind turbines 10' are frequently not producing power because wind speeds in a specific area are outside of the optimum wind speed range 60', which causes power interruptions, wind turbine 10' downtime and loss of revenue. In addition, the pitch controlled wind turbines 10' are often subjected to high structural loads in highly variable or blustery wind conditions due to the relatively slow rate of response of the pitch control system to highly variable wind speeds and directions.

The prior art wind turbine blades 14' utilizing stall and pitch control are designed such that they begin producing power at a cut in wind speed 48', continue to produce power as the wind speed increases, begin producing a maximum power $P_{max}'$ at a lower rated speed 58' and lose lift and stall or shutdown at and above the shutdown speed 50'. In wind speeds above the shutdown speed 50', the wind turbine 10' is shutdown to minimize the above-discussed structural loads and possible damage resulting therefrom. As can be seen graphically in FIGS. 1, 7 and 8, the prior art stall and pitch controlled wind turbines 10' with the conventional blades 14' are limited in both their range of operation and power production.

Generally, the stall and pitch control wind turbines 10' may be efficiently operated in a geographical area that has low wind variability with a mean annual wind speed of more than six meters per second (6 m/s) and wind speeds that do not frequently exceed approximately twenty-five meters per second (25 m/s). In wind conditions exceeding approximately twenty-five meters per second (25 m/s), the wind turbine 10' must be shutdown to avoid structural damage. Unfortunately, geographical areas that have mean annual wind speeds greater than approximately six meters per second (6 m/s) but less than twenty-five meters per second (25 m/s), low peak wind speeds and low wind speed variability are highly limited. In addition, such ideal geographical locations are generally located great distances from populated areas. Therefore, wind turbines that operate in an expanded wind speed range, operate effectively in variable wind conditions and are able to efficiently and safely extract power from high speed winds are desirable.

The primary technical barrier to extracting the maximum amount of power from the wind at a given location is the rate and/or magnitude of response of the control system and its impact on the efficiency and the above-described structural considerations of the wind turbine 10'. These barriers may drive the acquisition costs of the wind turbine 10' and the length of the blades 14' that may be utilized. The advanced aerodynamic control system for a high output wind turbine is a device utilized to, increase the energy capture of the wind turbine, maintain or reduce the operating and shutdown structural loads on the wind turbine, increase the operating range of the wind turbine and/or overcome the length limitations of the prior art wind turbine blades 14'. A preferred embodiment of the control system of the present invention is able to reduce the acquisition costs of the wind turbine components and decrease the amount of time that the wind turbine spends in shutdown mode by increasing the energy capture of the blades while maintaining and, in some ranges, reducing the structural loads on the wind turbine. The ability to increase the length of the blades results in an increase in the swept area of the wind turbine blades and a quadratic increase in energy that may be extracted from a specific wind speed. The preferred control system of the present invention also permits operation of the wind turbine in an expanded wind speed range. The control system of the present invention overcomes some of the above-described limitations of the prior art wind turbine and blades through the use of the control system with a Coanda-type turbine blade. The Coanda-type blade permits relatively quick modification of the lift and drag properties of the wind turbine blades in various wind conditions. Specifically, the use of the control system permits operation of the wind turbine in a wider optimum wind speed range with similar or reduced structural loads on the wind turbine and, therefore, reduced component costs and extended component life. The control system of the wind turbine also enhances the efficient power extraction from the wind over a useful range of wind speeds.

Alternatively, in another embodiment of the present invention, the control system may be utilized with Coanda-type blades having a similar or equivalent length when compared to the prior art wind turbine blades. In such a configuration, the control system and Coanda-type blade of the present invention permit operation of the wind turbine in wind speed ranges outside of the operating range of a conventional state of the art wind turbine, decreases the structural loads encountered by the wind turbine when compared to the conventional wind turbine and may significantly reduce the life cycle and acquisition costs of the wind turbine when compared to the conventional wind turbine designed for similar conditions. Acquisition costs may be reduced, in part, due to the reduction in structural loads on the wind turbine. The reduction in structural loads encountered by the wind turbine using the control system and blades of the present invention may permit a wind turbine to operate in regions with extreme wind conditions. The wind turbine of this alternative embodiment may also operate more efficiently throughout the operating wind speed range when compared to the conventional wind turbine, thereby producing more power and revenue over the life of the wind turbine.

BRIEF SUMMARY OF THE INVENTION

The present invention is directed to an advanced aerodynamic control system for a wind turbine including a drive shaft and a turbine blade. The drive shaft and blade are rotatable about a drive shaft axis. The control system measures operating data of the wind turbine and adjusts wind turbine parameters to control the extraction of power from the wind turbine at specific wind speeds. The control system includes an air control system that is coupled to a duct. The duct extends from a first end of the blade toward a second end of the blade. At least one slot extends along a portion of a surface of the blade and is in communication with the duct. The operating data is measured by at least one instrument. A controller collects the operating data and compares the operating data to predetermined operating norms. The controller actuates the air control system to urge pressurized air into the duct and out of the at least one slot at a variable air flow rate based upon the comparison between the operating data and predetermined operating norms. Control of the pressurized air aids in controlling of the extraction of power from the wind flowing through a swept area of the wind turbine.

In another aspect, the present invention is directed to a control system for a wind turbine for measuring operating data and adjusting system inputs to regulate power output and/or structural loads on the wind turbine at predetermined operating wind conditions. The control system includes at least one wind turbine blade including a first end, a second end and a duct extending from the first end toward the second end. At least one slot is in communication with the duct and extends along a surface of the blade opposite the first end of the blade. At least one instrument is coupled to the wind turbine that measures the operating data. A controller is coupled to the at least one instrument. An air control system is coupled to the controller. The air control system introduces pressurized air into the duct and varies the flow rate of air out of the at least one slot. A pitch control system is coupled to the blade and the controller. The pitch control system varies a pitch of the blade relative to a wind. The controller collects operating data from the at least one instrument and compares the operating data to predetermined operating norms. The controller also actuates the air control system and pitch control system based upon the comparison of the operating data and predetermined operating norms.

In yet another aspect, the present invention is directed to a combination wind turbine and control system. The combination wind turbine and control system includes a stand with a base, a free end and a stand axis. The base is secured to a support surface. A drive shaft includes a drive shaft axis upon which the drive shaft rotates. The drive shaft is secured adjacent the free end of the stand and is rotatable about the stand axis. At least one blade is secured to the drive shaft and includes a first end, a second end and a duct extending from the first end toward the second end. At least one slot is in communication with the duct and extends along a surface of the blade opposite the first end. An air control system is in communication with the duct and the at least one slot. A pitch control system is in communication with the at least one blade. An instrument measures wind turbine operating date and is coupled to a controller. The controller is also coupled to the air supply and pitch control systems. The controller controls the air supply and pitch control systems based upon a comparison of the measured operating data and predetermined wind turbine operating norms.

In an additional aspect, the present invention is directed to a wind turbine for capturing wind energy. The wind turbine includes a stand with a free end and a base end secured to a support surface. A rotatable drive shaft is secured to the stand adjacent the free end and a plurality of blades are secured to the drive shaft. Each blade includes a first end, a second end, a duct extending from the first end toward the second end and at least one slot positioned along a surface of the blades opposite the first end. An air control system is in communication with the ducts and slots. A pitch control system is in communication with the blades. A controller alters a flow rate of air out of the slots with the air control system and the pitch of the blades with the pitch control system.

BRIEF DESCRIPTION OF THE SEVERAL VIEWS OF THE DRAWINGS

The foregoing summary, as well as the following detailed description of the preferred embodiment of the invention will be better understood when read in conjunction with the appended drawings. For the purposes of illustrating the invention, there is shown in the drawings an embodiment that is presently preferred. It should be understood, however, that the invention is not limited to the precise arrangements and instrumentalities shown.

The present invention will hereinafter be described in conjunction with the appended drawing figures, wherein like numerals indicate like elements, and:

In the drawings:

FIG. 1 is front perspective view of a prior art wind turbine;

FIG. 2 is a front perspective view of a wind turbine in accordance with a preferred embodiment of the present invention;

FIG. 3 is a right-side perspective view of a blade of the wind turbine shown in FIG. 2;

FIG. 3A is an enlarged cross-sectional view of the blade shown in FIG. 3, taken along line 3A—3A of FIG. 3;

FIG. 3B is an enlarged cross-sectional view of the blade shown in FIG. 3, taken along line 3B—3B of FIG. 3;

FIG. 4 is a cross-sectional view of the right-hand side of the wind turbine shown in FIG. 2;

FIG. 5 is a greatly enlarged fragmentary cross sectional view of a portion of a hub of the wind turbine shown in FIG. 4;

FIG. 6 is a schematic block diagram of a control system of the wind turbine shown in FIG. 2;

FIG. 7 is a diagram comparing power output of a state-of-the-art wind turbine and the wind turbine shown in FIG. 2 over a range of wind speeds;

FIG. 8 is a diagram comparing blade loads of the state-of-the-art wind turbine and the wind turbine shown in FIG. 2 over a range of wind speeds; and FIG. 9 is a sample look-up table showing predetermined operating norms for a sample twenty-one kilowatt wind turbine.

DETAILED DESCRIPTION OF THE INVENTION

Figure 1:
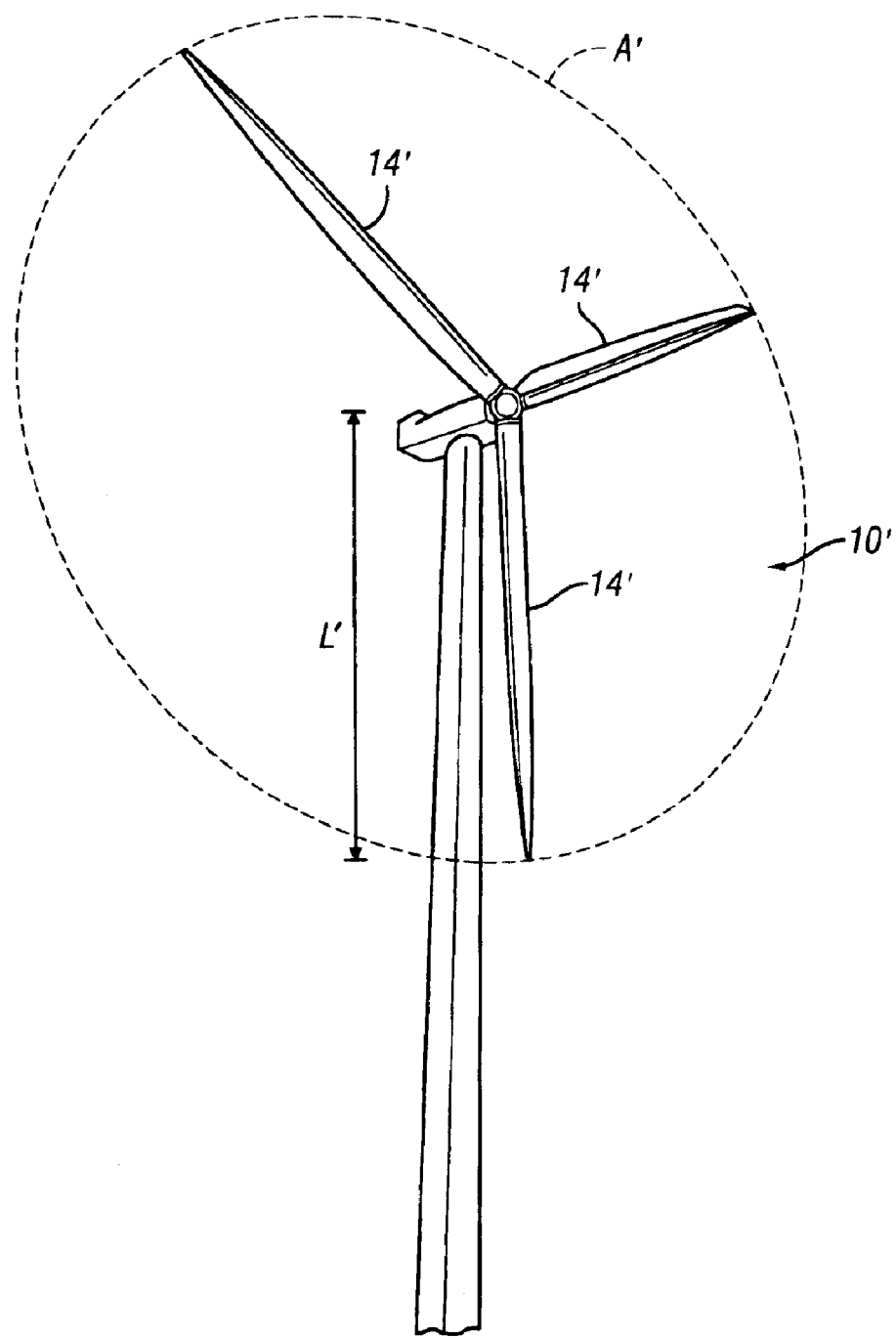

Referring to the drawings in detail, wherein like numerals indicate like elements throughout, there is shown in FIGS. 2–6, a preferred embodiment of an advanced aerodynamic control system 18 for a high output wind turbine 10, in accordance with the present invention.

In the preferred embodiment, the advanced aerodynamic control system 18 for the wind turbine 10 includes a drive shaft 12 and at least one blade 14. The drive shaft 12 and blade 14 are rotatable about a drive shaft axis 16. The control system 18 measures operating data of the wind turbine 10 and adjusts certain wind turbine parameters to control the extraction of power from the wind turbine 10 at a specific wind speed. The control system 18 includes an air control system 20 that is coupled to a duct 22. The duct 22 extends from a first end 14a of the blade 14 toward a second end 14b of the blade 14. The blade 14 also includes at least one slot 24 extending along at least a portion of a surface of the blade 14. The slot 24 is in fluid communication with the duct 22.

Figure 3A:
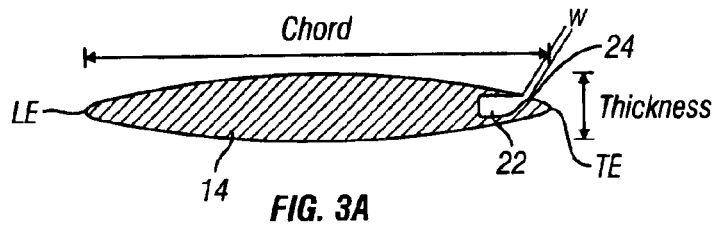
Figure 3:
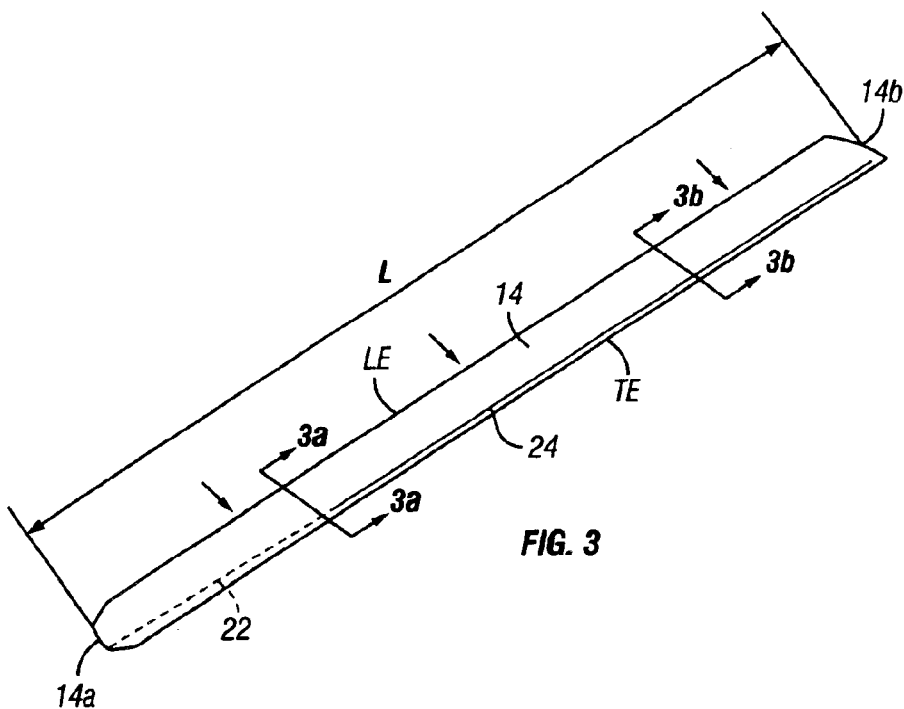
Figure 3B:
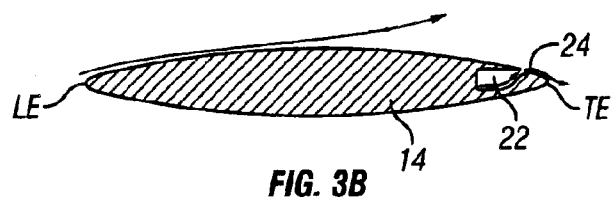

Referring to FIGS. 3–3B, in the preferred embodiment, the duct 22 is comprised of a cavity located within the interior of the blade 14 that traverses a length L of the blade 14 from the first end 14a to the second end 14b. In this preferred embodiment, the first end 14a is a root end 14a of the blade 14 and the second end 14b is a tip end 14b of the blade 14. Preferably, the at least one slot 24 extends along the surface of the blade 14, generally parallel to a trailing edge TE of the blade 14. The slot 24 is generally in communication with the duct 22 along its entire length such that air may flow within the duct 22 from the first end 14a, toward the second end 14b and out of the entire length of the slot 24 adjacent the trailing edge TE of the blade 14. Alternatively, the slot 24 may be blocked and air may be pumped into the duct 22 such that a pressure is built up within the duct 22. The slot 24 may then be opened such that the air flows out of the slot 24. The air flowing out of the slot 24 is preferably directed toward the trailing edge TE of the blade 14 along the surface of the blade 14. However, the air flowing out of the slot 24 is not limited to being directed along the surface of the blade 14 toward the trailing edge TE and may be directed out of the slot 24 in nearly any direction to impact the aerodynamic performance of the blade 14. The duct 22 and slot 24 are designed such that the structural integrity of the blade 14 is not significantly affected by the inclusion of the duct 22 and slot 24.

In the preferred embodiment, the blade 14 is constructed of a carbon fiber composite material. Construction of the blade using the carbon fiber composite material permits the duct 22 and slot 24 to be integrally formed within the blade 14. In addition, the carbon fiber composite material has a relatively high strength to weight ratio permitting construction of a blade 14 having a relatively high strength and stiffness coupled with a relatively low weight. One having ordinary skill in the art will realize that these characteristics are particularly desirable for the wind turbine blade 14 of the present invention. In addition, the carbon fiber composite material is highly resistant to corrosion from exposure to various weather conditions that the wind turbine 10 experiences during use. However, the blade 14 is not limited to carbon fiber constructions and may be constructed of nearly any material that is able to take on the shape/structure, withstand the structural loading and operate in the typical environment of the blade 14. For example, the blade 14 may be constructed of any number polymeric materials including thermosets and/or thermoplastics, metal, wood or a combination of these materials.

In the preferred embodiment, the at least one slot 24 extends along the surface of the blade 14 on an outer eighty percent of the length L, generally parallel to a trailing edge TE of the blade 14. As is shown in FIG. 3, the slot 24 extends along the surface of the blade 14 from the second end 14b toward the first end 14a on the outer eighty percent of the blade 14. The slot 24 is not limited to the above-discussed locations and configurations on the blade 14. For example, in an alternate embodiment, the at least one slot 24 may extend along the surface of the blade 14 on an outer seventy percent of the length L, generally parallel to a leading edge LE of the blade 14 (not shown). Further, the slot 24 is also not limited to locations on either the trailing or leading edges TE, LE and is not limited to a single slot 24 positioned along the surface of the blade 14. For example, the slot 24 may be comprised of a plurality of shorter length slots (not shown) positioned at spaced locations nearly anywhere on the blade 14 from the first end 14a to the second end 14b. The key being that the slot 24 and/or multiple slots 24 communicate with a duct 22 such that air may flow through the duct 22 and out of the slot 24. However, positioning of the slot 24 adjacent the trailing edge TE of the blade 14 adjacent an outer eighty percent of the length L of the blade 14 and particularly adjacent the second end 14b of the blade 14 is conducive for the preferred use of the advanced aerodynamic dynamic control system 18 for the wind turbine 10, as will be discussed in greater detail below.

Figure 4:
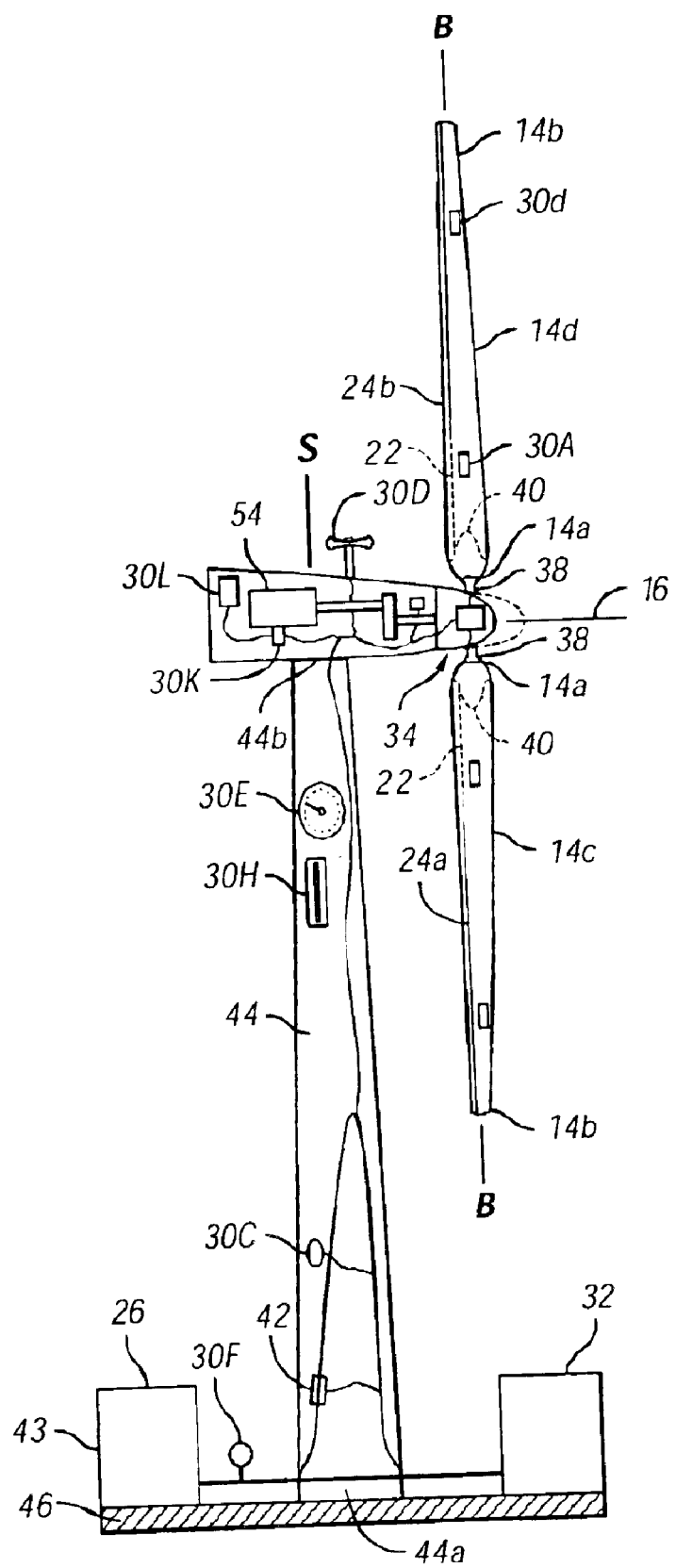
Figure 5:
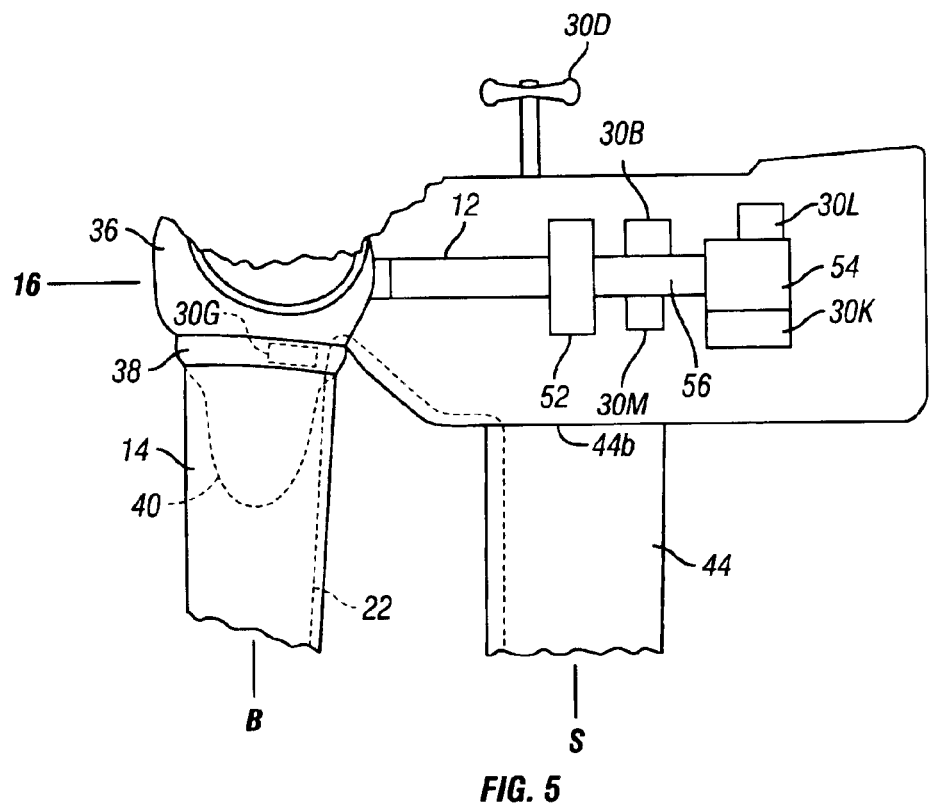

Referring to FIGS. 3–5, the advanced aerodynamic control system 18 for the wind turbine 10 also includes at least one instrument 30 for measuring operating data of the wind turbine 10. In the preferred embodiment, the at least one instrument 30 is selected from the group consisting of a strain sensor 30A, a tachometer 30B, a pressure sensor 30C, an anemometer 30D, a thermometer 30E, a flow sensor 30F, a position indicator 30G, a barometer 30H, a vibration gauge 30J, a torque sensor 30K, a power sensor 30L and an accelerometer 30M. The above-listed instruments measure various operating data of the wind turbine 10. The above list of instruments 30 is not meant to be all-inclusive and the wind turbine 10 may utilize nearly any instrument that is able to provide operating data regarding the wind turbine 10 and/or the environment that the wind turbine 10 is operating within. Preferably, multiple instruments 30 are utilized to measure operating data of the wind turbine 10 and the environmental conditions that the wind turbine 10 is operating within.

Referring to FIGS. 2 and 4–6, the control system 18 for the wind turbine 10 further includes a controller 32 that collects the operating data from the instruments 30 and compares the operating data to predetermined operating norms of the wind turbine 10. The controller 32 actuates the air control system 20 to urge pressurized air into the duct 22 and out of the at least one slot 24. The controller 32 may urge a release of air from the slot 24 at a variable air flow rate based upon the comparison between the operating data and the predetermined operating norms. By urging pressurized air into the duct 22 and out of the slot 24, the controller 32 is able to control the extraction of energy from the wind flowing through a swept area A of the wind turbine 10 at specific wind speeds. The controller 32 may also regulate structural loads encountered by the wind turbine 10.

The controller 32 utilizes the Coanda effect to control the lift and drag properties of the blade 14 by blowing air out of the slot 24, as will be discussed in greater detail below. For example, the controller 32 may receive operating data from the instruments 30 including a power reading, a pressure within the duct 22, an air flow rate out of the slot 24 and a torque. When comparing this operating data to the predetermined norms in specific operating conditions for a specific wind turbine 10, the controller 32 may direct the air control system 20 to produce a relatively high air pressure in the duct 22 such that a relatively high flow rate of air is released from the slot 24, thereby increasing the lift properties of the blade 14. Increasing the lift properties of the blade 14 may permit the blade 14 and drive shaft 12 to increase torque and power output and for the wind turbine 10 to reach its maximum power output $P_{max}$ before a conventional wind turbine 10' would reach its maximum power output $P_{max}'$. Alternatively, the controller 32 may collect the same operating data for the wind turbine in a different wind condition and direct the air control system 20 to reduce the pressure within the duct 22 such that a lower flow rate of air is released from the slot 22, thereby generally decreasing the lift properties of the blade 14 in specific wind conditions. This may cause the blade 14 to at least partially stall and may reduce the structural loading on the wind turbine 10. One having ordinary skill in the art will realize that reducing the flow rate of air from the slot 22 does not always decrease the lift properties of the blade 14 and may, in certain wind condition, maintain the lift properties of the blade 14. The preferred advantages of the control system 18 of the present invention are graphically shown in FIG. 7 wherein the wind turbine 10 captures power at a lower cut-in-speed 48 than a cut-in-speed 48' of the prior art wind turbine 10' and to reaches a maximum power output $P_{max}$ at a lower rated speed 58 than the rated speed 58' of the prior art wind turbine 10'. Ideally, the wind turbine 10 is constantly operating within the range of its rated speed 58 because this is the range in which the wind turbine 10 operates most efficiently and produces its maximum power $P_{max}$.

The lift and drag properties of the blade 14 of the wind turbine 10 are controlled by the principles of the Coanda effect. In general, the Coanda effect is an aerodynamic boundary layer control technique, utilized with the blade 14, to increase the flow circulation of the blade 14. The lift and drag properties of the blade 14 may be impacted by blowing air out of the slot 24, in specific wind conditions. The Coanda boundary layer technique employed by the blade 14 utilizes a stream of air blown out of the narrow slot 24 at variable flow rates to manipulate the lift and drag properties of the blade 14, which causes the air flow around the blade 14 to detach from the blade 14 or to remain attached along the surface of the blade 14. The air flow from the slot 24 may be varied accurately and rapidly in order to vary the lift and drag characteristics of the blade 14. The use of the control system 18 with the Coanda-type blade 14 permits control of the energy output of the wind turbine 10 by manipulating the lift and drag properties of the blade 14. The control of wind turbine power is manipulated by either promoting flow circulation over the blade 14 to increase the aerodynamic lift of the blade 14 or by permitting various levels of detached flow to develop over the blade 14 to generally reduce the aerodynamic lift of the blade 14. For example, the lift of the blade 14 may be reduced in a preferred embodiment by reducing or terminating air flow from the slot 24, which causes air flow to partially detach from a surface of the blade 14 and reduce lift. In specific conditions, the reduction or termination of air flow from the slot 24 may cause the blade 14 to stall. Alternatively, in a preferred embodiment, the lift of the blade 14 may be increased by increasing air flow from the slot 24 located at a predetermined position on a surface of the blade 14. This release of a comparatively high flow rate of air from the slot 24 preferably causes the air flow to remain attached to the surface of the blade 14 for a longer period of time and increasing lift of the blade 14, which in turn, preferably increases torque and power output of the wind turbine 10.

Figure 6:
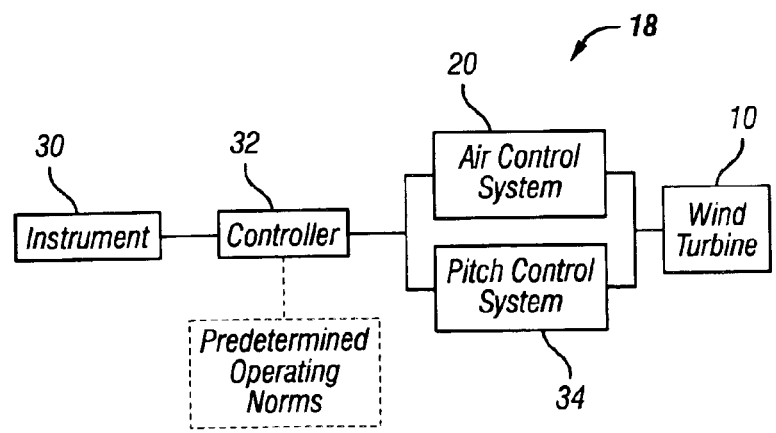
Figure 7:
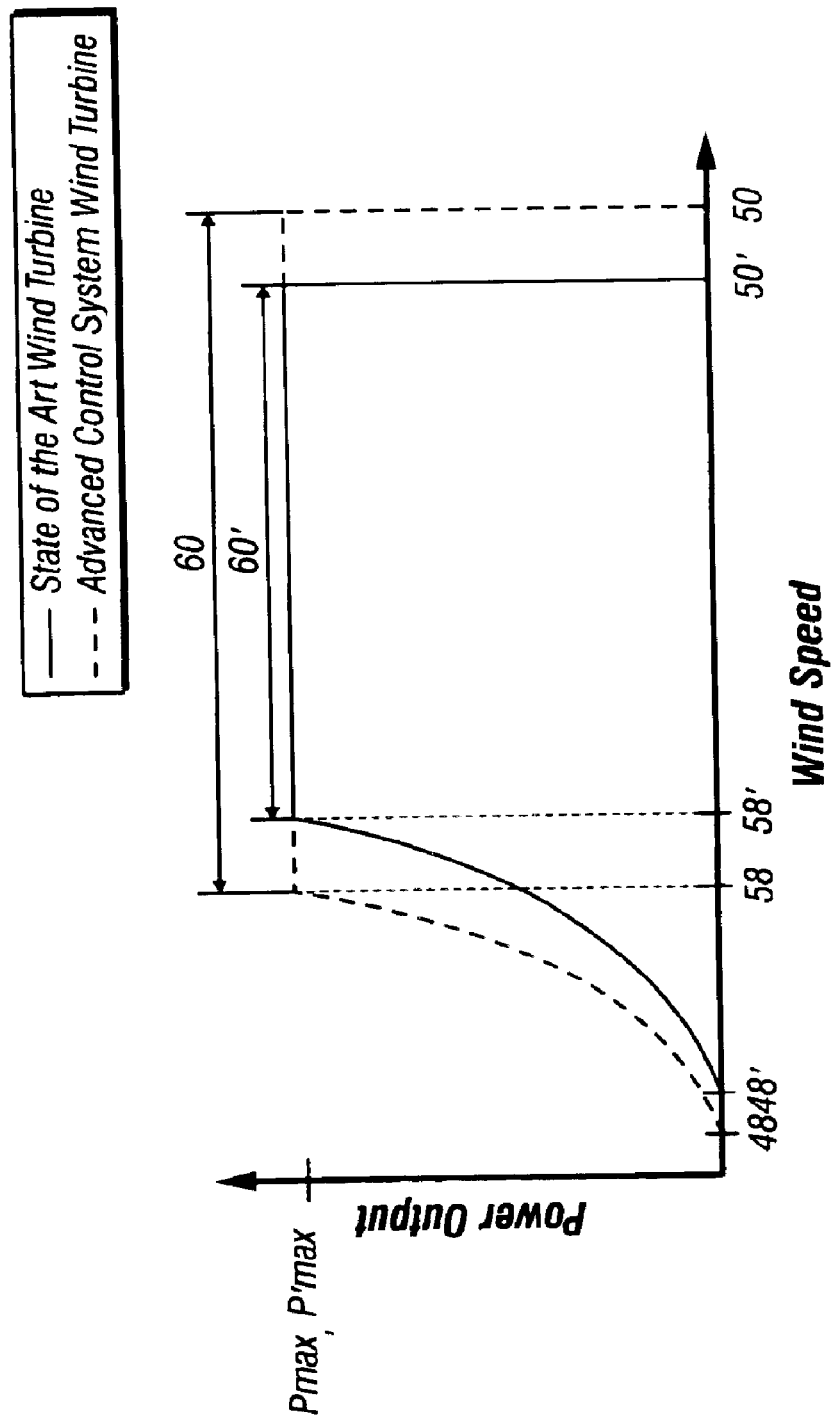
Figure 8:
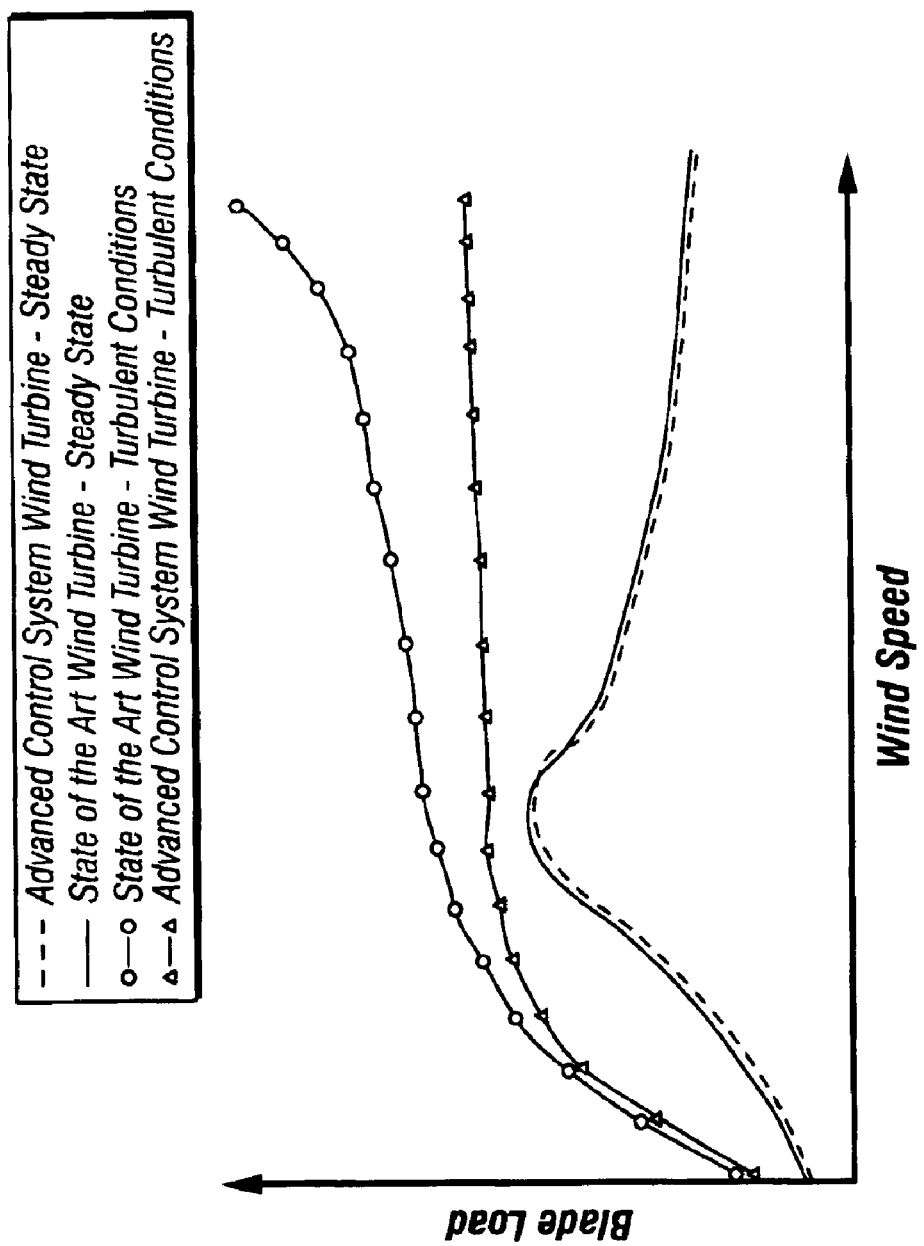

Referring to FIGS. 2, 3 and 6–8, in the preferred embodiment, the release of pressurized air at approximately one-half to ten times the velocity of the airflow around the blade 14 allows the lift and drag properties of the blade 14 to be manipulated. The lift and drag properties of the blades 14 impact the power output of the wind turbine 10 in specific wind conditions. A prior art blade 14', having a thickness to chord ratio of the preferred blade 14 of the present invention, would not be able to operate in low wind speeds without the air control system 20, the slot 24 and the control system 18. The prior art blades 14' generally are unable to operate in these low wind speeds because they are not designed to operate in this wind speed range (FIG. 7). Further, the wind turbine 10 of the present invention is generally able to operate in extreme wind conditions where the prior art wind turbine 10' is unable to operate, because the blade 14 together with the control system 18 reduces wind turbine 10 structural loads when compared to the prior art blade 14'. The structural loads of the wind turbine 10 are preferably controlled by attenuating the air flow rate through the slot 24. This reduction in loads is dramatic when the wind turbines 10, 10' are subjected to turbulent and high speed wind conditions, which are common in geographical areas that have the desired high mean wind speeds, as is shown in FIG. 8.

Referring specifically to FIGS. 7 and 8, during a shutdown wind condition 50, 50', the air control system 20 and/or pitch control system 34 is actuated by the controller 32 to cause the blade 14 to generate significantly reduced loads when compared to the state-of-the-art blade 14' and wind turbine 10'. Therefore, while a conventional blade 14' may fail or cause damage to its structure at or above shutdown wind speeds 50, 50', the control system 18 of the present invention recognizes the extreme wind speeds 50, 50' and alters the lift and drag properties of the blades 14 to reduce structural loads. Consequently, the wind turbine 10 continues to extract power from the wind while the prior art wind turbine 10' may have to shutdown. The change in air flow from the slot 24, change in pitch of the blade 14 and shape of the blade 14 preferably reduce the structural loads generated on the structural components of the wind turbine 10. Accordingly, the wind turbine 10 of the present invention is able to safely operate during extreme wind conditions and is able to survive shutdown conditions without damage to the wind turbine 10. In addition, the manipulation of the lift and drag properties and resulting control of loads allows the blades 14 to have a physical length L that is greater than the length L' of the state-of-the-art-blades 14' permitting the wind turbine 10 to begin producing power at a cut-in wind speed 48 below the cut-in wind speed 48' of the state-of-the-art wind turbine 10'. That is, the greater length L of the blades 14 of the wind turbine 10 results in a greater swept area A when compared to the state-of-the-art wind turbine 10', thereby permitting the wind turbine 10 to begin producing power at the lower cut-in wind speed 48 and to produce more power than the state-of-the-art wind turbine 10' in low wind speed conditions (FIG. 7).

Referring to FIG. 4, in the preferred embodiment, the control system 18 for the wind turbine 10 further includes the pitch control system 34 that is coupled to the blade 14 and the controller 32. The pitch control system 34 alters the pitch of the blade 14 based upon signals from the controller 32. In the preferred embodiment, the pitch control system 34 includes a hub shaft 38 that is fixedly secured to a hub 36 and drive shaft 12, a pitch linkage 40 that is rotatably secured to the hub shaft 38 and is fixedly secured to the blade 14, a location detector (not shown) that measures the location of the pitch linkage 40 relative to the hub shaft 38 and a drive system (not shown) generally located within the hub 36 that drives the rotation of the pitch linkage 40 relative to the hub shaft 38. The drive system is preferably comprised of a hydraulic drive system that urges the pitch linkage 40 to rotate relative to the hub shaft 38 and hub 36, upon command of the controller 32. The pitch linkage 40 extends into the first end 14a of the blade 14 and is fixedly secured to the blade 14 such that when the pitch linkage 40 rotates about the hub shaft 38, the blade 14 rotates about the hub shaft 38, thereby altering the pitch of the blade 14. The pitch control system 34 is not limited to the above-described structure and configuration and may be comprised of any structure and/or components that permit the pitch of the blade 14 to be altered through commands of the controller 32.

Preferably, the pitch control system 34 alters the pitch of the blade 14 by rotating at least a portion of the blade 14 about a blade axis B. As was described above, in the preferred embodiment, a hydraulic drive system drives rotation of the pitch linkage 40 about the hub shaft 38 to alter the pitch of the blade 14 relative to the blade axis B. The pitch control system 34 is not limited to the use of a hydraulic drive system to alter the pitch of the blades 14 about the blade axis B. For example, the pitch control system 34 may be driven by a set of gears that alter the pitch of the blade 14 about the blade axis B based upon inputs from the controller 32.

The air control system 20 of the preferred embodiment includes an air flow control mechanism 26 that is actuated by the controller 32 to control the air pressure within the duct 22. The air supply system 20 affects the flow rate of air out of the slot 24. In a preferred embodiment, the air flow control mechanism 26 includes a valve 42 and a volume of pressurized air 43 that are in communication with the controller 32. The controller 32 is able to regulate the air pressure in the air flow control mechanism 26 and the duct 22. The air flow control mechanism 26 is preferably comprised of a blower system 26 that pressurizes air and introduces the pressurized air into the duct 22 upon actuation of the controller 32. In one embodiment, the introduction of various air pressures into the duct 22 controls the flow rate of air out of the slot 24. The air control system 20 is not limited to such configurations and may be comprised of any combination of devices that produces a controllable air flow rate out of each of the slots 24.

Referring to FIGS. 3A–4, in a preferred embodiment, the at least one slot 24 has a width W that is variable along a length of the slot 24. Depending upon the length of the slot 24, when pressurized air is introduced into the duct 22, a significant amount of the pressure may be released adjacent an end of the slot 24 nearest the first end 14a of the blade 14. This in turn may result in a pressure gradient along a length of the duct 22 and a variable flow rate of air along the length of the slot 24 due to the pressure gradient. The variable width W along the length of the slot 22 mitigates this variable flow rate and pressure gradient as is understood by one of ordinary skill in the art to possibly cause stall along portions of the blade 14 and lift along other portions of the length L of the blade 14. It is preferred that the flow rate out of the slot 24 is relatively uniform to promote uniform lift and drag properties along the length L of the blade 14, however, such a uniform flow rate is not required. Accordingly, the variable slot width W prompts the preferred uniform flow rate of air from the slot 24 along the length of the slot 24. However, the slot 24 is not limited to variable slot widths W along the slot 24 length and may function with a constant slot width W or an actively controlled slot width W.

Figure 2:
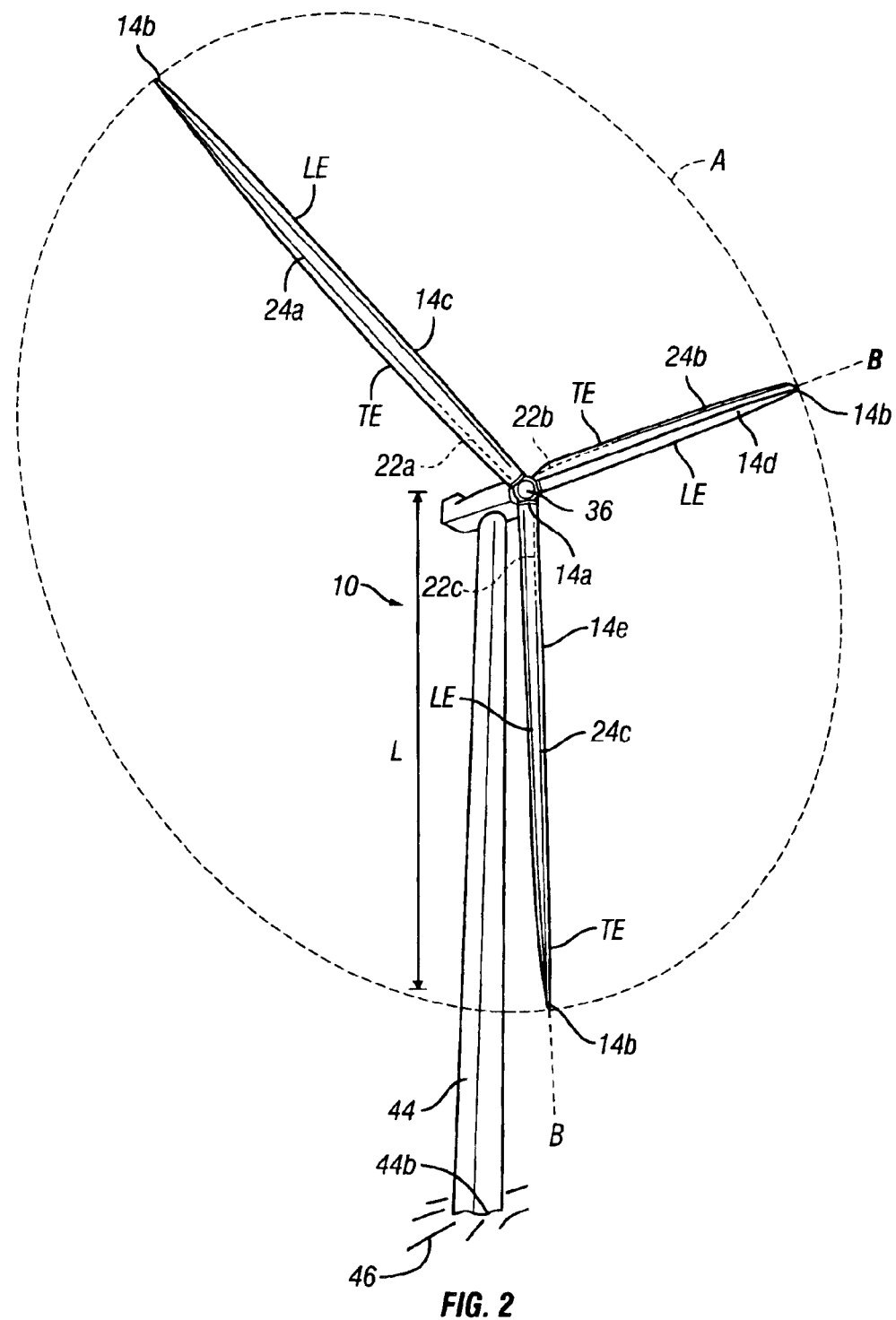

Referring to FIGS. 2 and 4, in the preferred embodiment, the wind turbine 10 includes three blades 14c, 14d, 14e, each with ducts 22a, 22b, 22c that are supplied with a specific flow rate of air or pressure by the air control system 20, generally with an equivalent air flow rate or pressure into each duct 22a, 22b, 22c. The controller 32 regulates the air pressure in each of the ducts 22a, 22b, 22c by sampling operational data provided by the pressure sensor 30C and actuation of the air control system 20. In addition, the controller 32 regulates the air flow rate out of the slot 24 by sampling operational data provided by the flow sensor 30F and through control of the air control system 20. However, the control system 18 for the wind turbine 10 is not limited to this configuration, as is discussed in greater detail below.

In an alternative configuration of the air control system 20, the wind turbine 10 includes at least a first blade 14c and a second blade 14d. The first blade 14c includes a first duct 22a and a first slot 24a and the second blade 14d includes a second duct 22b and a second slot 24b. The controller 32 actuates the air control system 20 to supply a first predetermined air pressure to the first duct 22a and a second predetermined air pressure to the second duct 22b. The controller 32 also actuates the air control system 20 to produce a first flow rate from the first slot 24a and a second flow rate from the second slot 24b. The first pressure may be different that the second pressure and the first air flow rate may be different than the second flow rate. Such a configuration of the air control system 20 permits individual control of the lift properties of the first and second blades 14c, 14d. The above-described configuration of the air control system 20 is advantageous if the first blade 14c is performing differently than the second blade 14d. Specifically, the lift and drag properties of each blade 14c, 14d may be manipulated to maximize the performance of each blade 14c, 14d, regardless of whether each blade 14c, 14d is responding in the same manner to the same wind conditions. Accordingly, the ability of the air control system 20 to supply variable air pressures to the ducts 22a, 22b and variable air flow rates out of the slots 24a, 24b of the first and second blades 14c, 14d permits control of the lift and drag properties of the individual blades 14c, 14d. Further, the air control system 20 may also manipulate the pressure and air flow rate associated with a third blade 14e, which includes a third duct 22c and a third slot 24c to optimize its lift and drag properties. The wind turbine 10 of the present invention is not limited to a specific number of blades 14 and may include nearly any number of blades 14.

The above-described embodiment of the air control system 20 that produces different pressures in ducts 22a, 22b, 22c and different air flow rates from slots 24a, 24b, 24c of multiple blades 14c, 14d, 14e will not operate with the valve 42 and volume of pressurized air 43 shown in FIG. 4. Specifically, the valve 42 and volume of pressurized air 43 of FIG. 4 is designed to provide an equivalent air pressure to each of the ducts 22a, 22b, 22c. Accordingly, the air control system 20 is not limited to configurations utilizing a valve 42 and volume of pressurized air 43 to control the air flow rate into the ducts 22a, 22b, 22c, as is shown in FIG. 4. For example, individual valves (not shown) may be inserted into each duct 22a, 22b, 22c to control the air pressure in each of the ducts 22a, 22b, 22c. Alternatively, fans (not shown) may be inserted into each duct 22a, 22b, 22c that are actuated by the controller 32 to provide a desired air flow rate in each of the ducts 22a, 22b, 22c and out of the slots 24a, 24b, 24c. The preferred controller 32 is able to actuate the air control system 20 to provide a desired air pressure into each of the ducts 22a, 22b, 22c and to release a desired air flow rate from each of the slots 24a, 24b, 24c, based upon a comparison between the operating data and predetermined operating norms of the blades 14c, 14d, 14e. The controller 32 may be able to control the flow rate of air from the individual slots 24a, 24b, 24c by actuating a blocking mechanism that actively changes the width W of the slot 24.

Referring to FIGS. 2–6, the control system 18 of the present invention is designed to measure operating data of the wind turbine 10 and adjust at least the air pressurization system 20 of the wind turbine 10. The control system 18 preferably efficiently captures power from wind flowing through the swept area and aids in regulating structural loads of the wind turbine 10 at predetermined operating wind conditions. The slot 24 extends to the second end 14b of the blade 14, in the preferred embodiment, because the lift properties of the blade 14 may be significantly improved in a majority of configurations by blowing air out of the slot 24 adjacent the second end 14b of the blade 14. In general, air blown out of a slot 24 adjacent the second end 14b or tip end 14b of the length L of the blade 14 toward the blade's 14 trailing edge TE has a greater effect upon the lift properties of the blade 14 than blowing air out of a similar slot 24 adjacent a first end 14a or root end 14a of the blade 14. Accordingly, in the preferred embodiment, the slot 24 is generally located on the outer eighty percent of the length L adjacent the trailing edge TE of the blade 14. However, the slot 24 is not limited to being positioned on the outer eighty percent or adjacent the trailing edge TE of the blade 14 and is not limited to a single slot 24 along the surface of the blade 14, as was described above.

Referring to FIG. 4, in the preferred embodiment, the pitch control system 34 is coupled to the blade 14 and the controller 32. The pitch control system 34 is actuated to vary a pitch of the blade 14 relative to a wind passing through the swept area A of the wind turbine 10. The controller 32 collects operating data from the at least one instrument 30 and compares the operating data to predetermined operating norms. Using the comparison, the controller 32 actuates the air supply 20 to vary air flow within the ducts 22a, 22b and/or the pitch control systems 34 to alter the pitch of the blades 14c, 14d. The pitch control system 34 may be utilized to roughly place the blades 14c, 14d in an optimum position with respect to a wind passing through the swept area A while the air control system 20 may be utilized to finely tune the lift properties of the blade 14 and to aid in quickly altering the blade 14 lift properties. The pitch control system 34 may be particularly suited to rough optimization of the blade 14 lift properties in specific configurations due to its relatively slow response to changing wind conditions. In contrast, the air control system 20 may be suited to fine tuning the lift properties because of its comparatively quick response time in altering the lift properties of the blades 14. Specifically, the relatively slow response time of the pitch control system 34 may be suited to positioning the blade 14 in an optimum position with respect to a wind attacking the blade 14 from a specific direction, while the quick response of the air control system 20 may be suited to quickly altering the lift and drag properties of the blade 14 due to slight changes in wind direction and/or speed.

One having ordinary skill in the art will realize that the present invention is not limited to the inclusion of the pitch control systems 34. The pitch control system 34 is provided with some of the embodiments of the control system 18 and wind turbine 10 to enhance or compliment the air control system 20 of the present invention.

Referring to FIGS. 2, 4 and 5, the preferred wind turbine 10 includes a stand 44 with a base 44a, a free end 44b and a stand axis S. The base 44a is secured to a support surface 46 and the drive shaft 12 is secured to the stand 44 adjacent the free end 44b. The drive shaft 12 is rotatable about the drive shaft axis 16, while the drive shaft 12, hub 36 and blade 14 are each preferably rotatable about the stand axis S. Rotation of the drive shaft 12, hub 36 and blades 14 about the stand axis S permits the blades 14 to be oriented in an optimum yaw position relative to nearly any wind directed that flows past the stand 44. That is, regardless of which direction the wind is blowing relative to the stand 44, the blades 14, hub 36 and drive shaft 12 may be rotated such that the wind turbine 10 is able to capture energy from the wind as it passes through the swept area A. The wind turbine 10 is not limited to such constructions and may alternatively be constructed, for example, as a Darius-type vertical axis wind turbine (see U.S. Pat. No. 4,504,192). One having ordinary skill in the art would realize how to adapt the controller 32, air control system 20 and pitch control system 34 for use with a vertical axis wind turbine. Therefore, the above-described wind turbine 10 construction is utilized to describe the present invention but is not meant to be limiting.

The yaw of the wind turbine 10 may be passively controlled or may be actively controlled by a yaw control system (not shown) that is actuated by the controller 32 in a similar manner to the pitch control system 34. That is, the rotational position of the drive shaft 12, hub 36 and blade 14 relative to the stand axis S may be passive such that the direction of the wind itself urges the drive shaft 12, hub 36 and blade 14 into a specific rotational position relative to the stand axis S or the instruments 30 may provide operating measurements to the controller 32, which compares the operating measurements to predetermined operating norms and directs the yaw control system to actuate the yaw of the drive shaft 12, hub 36 and blade 14 relative to the stand axis S. One having ordinary skill in the art would realize how to adapt the active or passive yaw control systems to the wind turbine 10 and, therefore, the yaw control system will not be described in detail.

Referring to FIGS. 3–4, the air control system 20 may be actuated by the controller 32 to one of an open position permitting a maximum flow rate of air to exit the at least one slot 24, a closed position inhibiting air flow flowing out of the at least one slot 24 and a plurality of partially opened positions permitting a flow rate of air between the maximum flow rate and no flow to flow out of the at least one slot 24. For example, in a preferred embodiment, the valve 42 may be positioned at a fully opened position such that the volume of pressurized air 43 creates a maximum flow rate of air through the valve 42, into the duct 22 and out of the length of the slot 24. In this embodiment, a variable width W slot 24 may aid in developing a relatively uniform flow rate of air out of the entire length of the slot 24, as was described above. In addition, the valve 42 may be completely closed, thereby inhibiting air from flowing out of the volume of pressurized air 43 and into the duct 22 and slot 24. Further, the valve 42 may be positioned at any of a plurality of partially opened positions where the volume of pressurized air 43 creates a flow rate of air into the duct 22 and out of the length of the slot 24 that is somewhere between the maximum flow rate and no flow. In addition, the fans that were described above could be powered to a maximum power to create a maximum flow rate, turned off to create no flow or to any of a plurality of intermediate powers, thereby creating a plurality of intermediate air flow rates out of the slot 24.

In the second preferred embodiment of the air control system 20, the valve 42 is opened to produce a pressure in the duct 22 when the controller actuates the blocking mechanism to block the slot 24. In this position, the air control system 20 is in the closed position. The controller 32 may actuate the blocking mechanism to move toward the retracted position and into one of the plurality of intermediate positions, partially exposing the slot 24, and permitting an intermediate flow rate of air to exit the slot 24. This movement of the blocking mechanism causes air to flow out of the slot 24 impacting the lift and drag properties of the blades 14. Actuating the blocking mechanism to its retracted position positions the air control system 20 in the open position and permits air flow from the slot 24 at a maximum rate, depending upon the pressure within the duct 22. The air control system 20 is not limited to any of the above-described preferred embodiments and may be constructed in any manner that permits control of air flow from the slots 24 by the controller 32.

Referring to FIGS. 4–6, in a preferred embodiment, the air control system 20 is actuated by the controller 32 to the open position to aid the at least one blade 14 and drive shaft 12 during start-up. Releasing air from the slot 24 of the blade 14 at start-up, or when the wind turbine 10 is in a static condition, at least partially permits the wind turbine 10 to operate at the lower cut-in wind speed 48 than a cut-in wind speed 48' of the state-of-the-art wind turbine 10', In the preferred embodiment, blowing air out of the slots 24 may increase the lift properties of the blade 14 such that the wind turbine 10 may begin operating and producing power at the lower cut-in speed 48, when compared to the cut-in speed 48' of the state-of-the-art wind turbine 10'. Accordingly, the wind turbine 10 may be operated and produce power in geographical areas where the state-of-the-art wind turbine 10' is not able to operate due to the lower cut-in wind speed 48. As was discussed above, the wind turbine 10 with the control system 18 is also able to reach its rated wind speed 58 before the state-of-the-art wind turbine 10' reaches its rated wind speed 58'. This enables the wind turbine 10 to produce the maximum power output $P_{max}$ at lower wind speeds than the state-of-the-art wind turbine 10' and to have a larger optimum wind speed range 60 than that of the state-of-the-art wind turbine 10'. Preferably, this permits the wind turbine 10 of the present invention to increase power output and revenue of the wind turbine 10 over its lifetime.

The wind turbine 10 of the present invention including blades 14 having a length L that is greater than the length L' of the state-of-the-art wind turbine 14' does not necessarily require blowing of air out of the slots 24 at start-up to begin operation at a lower cut-in speed 48 than the cut-in speed 48' of the state-of-the-art wind turbine 10'. Specifically, the greater length L of the blades 14 alone may permit the wind turbine 10 to begin operating at the lower cut-in speed 48. The increased swept area A of the blades 14 of the preferred wind turbine 10 having the longer blades 14 may permit the wind turbine 10 to begin operating at the lower cut-in speed 48 because the increased swept area A is able to capture enough energy from the lower cut-in speed 48 to commence operation of the wind turbine 10 and produce energy.

Referring to FIGS. 4–8, the wind turbine 10 is preferably able to operate in extreme wind conditions and, therefore, geographical areas where a state-of-the-art wind turbine 10' can not cost effectively operate. Specifically, the wind turbine 10 may include blades 14 that have a greater inherent drag than the prior art blades 14'. In such configurations, the air control system 20 may be actuated by the controller 32 to the closed position to reduce the lift properties of the blades 14 and to slow rotation of the blades 14 in extreme wind conditions. The rotation of the blades 14 is slowed by the detachment of the air flow over the surface of the blades 14, thereby inducing the blades 14 into at least a partial stall condition. Such a reaction is particularly useful when wind speeds reach relatively high levels. Operation above the shutdown wind speed 50' of the prior art wind turbine 10' is preferably aided by the general shape of the blade 14 and actuation of the air control system 20 to reduce the lift properties of the blade 14. This result is possible because the blade 14' of the wind turbine 10 has a generally less efficient but more robust design when compared to the blade 14' of the state-of-the-art wind turbine 10'. This design advantage is graphically shown in FIG. 8, where the blade 14 loads are generally lower than the blade 14' loads of the state-of-the-art wind turbine 10' in turbulent wind conditions.

Referring to FIG. 4, in the preferred embodiment, a plurality of gears 52 is secured to the stand 44 adjacent the free end 44b to transmit rotational energy from the drive shaft 12 to a generator 54, thereby capturing electrical energy. In the preferred embodiment, the plurality of gears 52 are comprised of a set of reduction gears 52 that reduce the rate of rotation input from the drive shaft 12 to a lower rate of rotation in a generator shaft 56. One having ordinary skill in the art will realize that the wind turbine 10 is not limited to the above-described gear 52 and generator 54 configuration. Specifically, the wind turbine 10 may be configured to convert wind energy for various purposes, including but not limited to operation of a general purpose pump, an oil pump, a water pump and operation of a grinder, among other things.

Referring to FIG. 8, a comparison of blade loads is made between a state-of-the-art wind turbine blade 14' and the blade 14 of the wind turbine 10 utilizing the advanced control system 18. The comparison is made between a blade 14 that is thirty percent (30%) longer than the comparable state-of-the-art wind turbine blade 14'. While the load on the blades 14, 14' is nearly the same during steady state wind conditions, the loads encountered by the blade 14 of the wind turbine 10 are significantly lower during turbulent wind conditions. Generally, wind speeds and directions are constantly changing at preferred geographic locations. Accordingly, wind turbines 10, 10' are frequently subjected to turbulent wind conditions in normal operating conditions. Therefore, over the lifetime of the wind turbine 10, the control system 18 may greatly reduce the cyclical and peak loading upon the blades 14, thereby increasing the life of the blades 14 and the maintenance/inspection down time. For example, in a shutdown condition, which is often the most structurally demanding condition for any wind turbine 10, 10', the air flow through the slot 24 may be stopped altogether, thereby minimizing the aerodynamic lift and structural loads imparted to the wind turbine 10 and blades 14. The control system 18 may also permit the use of less sophisticated and/or less expensive gearing 52 or other components due to the reduced structural loads on the wind turbine 10. The use of less sophisticated structural components may in turn reduce the acquisition costs of the wind turbine 10.

The control system 18 is not limited to uses including each of the embedded gauges 30A–30M and may be, for example, controlled exclusively by data collected from the torque sensor 30K. In such a configuration, the collected torque data is compared to predetermined torque norms to control the air control system 20 and/or pitch control system 34. However, in the preferred embodiment, the embedded gauges 30A–30M and torque sensors 30K collect performance data of the rotating wind turbine 10 and communicate the data to the controller 32. The controller 32 actuates the air control system 20 to provide a greater or lesser flow rate of air to the slots 24, thereby optimizing the lift properties of the blades 14 and energy output of the wind turbine 10, based upon the comparison.

Referring to FIGS. 1, 2 and 4, in the preferred embodiment, the torque sensors 30K measure the torque and power output of the drive shaft 12 and transmit this measurement to the controller 32. The embedded strain sensors 30A and vibration gauges 30J are preferably embedded in or positioned on the surface of the blades 14 or at various locations on the structure of the wind turbine 10 to measure specific strain and vibrations of the wind turbine 10. Signals related to the measured data concerning, for example, the stress, strain, vibration or deflection of the blades 14 or other structure of the wind turbine 10 sensed by each of the sensors 30 are also transmitted to the controller 32. The controller 32 compares the measured data signals to predetermined operating norms and actuates the air control system 20 to send a predetermined flow rate of air to the ducts 22 and out of the slots 24 or actuates the air control system 20 to an off condition. In this manner, the controller 32 is able to regulate or control the power output of the wind turbine 10 and the structural integrity of both the blades 14 and the gearing 52 of the wind turbine 10, by controlling the lift and drag properties of the blades 14. The strain sensors 30A are not limited to locations on the blades 14 and may be positioned anywhere on the structure of the wind turbine 10 to measure structural component strain, for example, a strain sensor 30A may be positioned on the stand 44 to measure a strain of the stand 44, which may be manipulated to determine a deflection of the stand 44, blades 14 or other structure of the wind turbine 10.

In the preferred embodiment, the length L of the blades 14 may be approximately ten to sixty percent longer than the length L' of a comparable state-of-the-art blade 14', for operation in comparable conditions. In addition, referring to FIGS. 3 and 3B, the blade 14 of the preferred wind turbine 10 has a thickness to cord ratio of approximately ten to one hundred percent (10–100%). The thickness to cord ratio of the blade 14 is generally greater than the thickness to cord ratio of the blade 14' of the state-of-the-art wind turbine 10'. The greater thickness to cord ratio of the blade 14 permits a more structurally robust design when compared to the blade 14' of the state-of-the-art wind turbine 10', which aids in operation of the wind turbine in wind speeds above the prior art shutdown wind speed 50'.

It is preferred that at low wind speeds the air control system 20 forces a generally low flow rate of air out of the slots 24 located adjacent the trailing edge TE. In addition, between the rated wind speed 58 and shutdown wind speed 50 the air control system 20 preferably forces a high flow rate of air out of the slots 24. Further, at extreme wind or shutdown wind speeds 50 the air control system 20 is actuated to an off condition. The blowing and pitch is preferably continuously adjusted to extract a maximum net amount of energy from the encountered wind condition without causing damage to the wind turbine 10. The flow rates from the preferred trailing edge TE slots 24 described above are general rules of thumb and are not limiting. For example, the wind turbine 10 may be configured with a specific blade 14 having a length L designed for a particular location that may operate efficiently at relatively slow wind speeds with a range of flow rates of air blowing through the trailing edge TE slot 24. In addition, the same blade 14 may operate relatively efficiently in high or extreme wind speed conditions with a similar range of flow rates of air blowing through the trailing edge TE slot 24. An advantage of the control system 18 is that relatively efficient operation of the wind turbine 10 is achieved in a variety of wind conditions by collecting performance data from the instruments 30 and comparing the performance data to predetermined operating norms. This comparison prompts the controller 32 to actuate the air control system 20 to blow air out of the slots 24 at a specific flow rate. This flow rate is preferably a rate that permits the wind turbine 10 to capture a maximum amount of energy from a wind passing through the swept area A.

The controller 32 is preferably comprised of a programmable logic controller (PLC) and embedded software in the preferred embodiment, but is not limited to a PLC. The controller 32 may be comprised of a mainframe computer, a personal computer, a specialized computer, one or more CPU's, microprocessors or other computational devices known to those skilled in the art.

The control system 18 and wind turbine 10 may also be employed using blades 14 having a length L that is generally equivalent to the length L' of the prior art wind turbine 10'. In such a configuration, the wind turbine 10 of the present invention may employ structural components that are less expensive and/or less sophisticated than the structural components of the prior art wind turbine 10'. Generally, the largest expense of the wind turbine 10, as was discussed above, is the acquisition costs of the wind turbine 10. Specifically, the gear system 52 of the wind turbine 10 may comprise a relatively large part of the overall cost of the wind turbine 10 and the cost of the gearing 52 is generally a positive function of its operational load requirements. Sophisticated and/or expensive gears 52 must generally be employed in wind turbines 10 that are placed in a location where wind speeds are expected to reach or exceed the above-described shutdown wind speed 50, 50' to protect against failure of the gears 52. The control system 18 of the present invention may permit the use of less expensive and/or less sophisticated gears 52 with blades 14 having an equal length L to those of the blades 14' of the state-of-the-art wind turbines 10'. This substitution of less expensive gears 52 is accomplished by reducing the high loads encountered by the state-of-the-art wind turbines 10' (FIG. 8).

The preferred control system 18 permits optimization of the net power output of the wind turbine 10 by measuring various data inputs collected by the control system 18, which may include, but are not limited to, the air control system 20 power consumption, rotational speed of the drive shaft 12, power output of the generator 54, mechanical loads on the blades 14, drive train torque, generator 54 torque, vibration, harmonics and other system parameters. The control system 18 may permit minimization of mechanical loads on the blades 14 and gears 52 to extend the overall life of the wind turbine 10, reduce the maintenance costs of the wind turbine 10 and reduce the likelihood of catastrophic mechanical failure of the wind turbine 10. The control system 18, further, permits cyclical variation of the lift properties of the individual blades 14 as they pass the turbine stand 44 to minimize or eliminate undesired turbulence and/or strain upon the wind turbine 10 known as "tower shadow." The variation in lift properties of the blades 14 may be controlled rapidly and accurately by the control system 18 to constantly optimize the net power output of the wind turbine 10. By significantly increasing the energy capture of the wind turbine 10 without increasing the cost driving structural loads imparted to the wind turbine 10, the utilization of the blade 14, and control system 18 allows for a significant reduction of the cost of energy for a given set of wind conditions.

Referring to FIG. 9, as an example of the operation of the wind turbine 10 using the control system 18 of the present invention, a twenty kilowatt sample wind turbine 10 was modeled. FIG. 9 shows a sample look-up table of predetermined operating norms for the modeled twenty kilowatt sample wind turbine 10. This sample wind turbine 10 has six and one-half meter long blades 14 producing a swept area A of approximately one hundred thirty square meters and has a net rated power of sixteen kilowatts. The sample wind turbine 10 includes a power sensor 30L, a torque sensor 30K, a pressure sensor 30C, an anemometer 30D, a flow sensor 30F and a position indicator 30G. The power sensor 30L measures generator power, the torque sensor 30K measures drive shaft 56 torque, the pressure sensor 30C measures air pressure within the duct 22, the anemometer 30D measures wind speed in the area near the sample wind turbine 10, the flow sensor 30F measures an air flow rate out of the slot 24 and the position indicator 30G measures the pitch of the blade 14 relative to an initial position. These measured values are sampled and recorded by the controller 32 at a rate of approximately twenty hertz (20 Hz). In use, the measured values are compared to the measured values from a previous time step and to the values shown in the look-up table shown in FIG. 9. Based upon this comparison, the controller 32 actuates the air supply system 20 and/or the pitch control system 34 to change the mass flow rate of air out of the slot 24 and/or the pitch of the blade 14. The controller 32 actuates the air supply system 20 and/or pitch control system 34 to maximize the time that the sample wind turbine 10 spends at its rated power of sixteen kilowatts (16 kW).

As an example of the operation of the sample wind turbine 10, at an initial time interval, the controller 32 may receive measured values from the instruments 30 including a generator power of eleven and three tenths kilowatts (11.3 kW), a wind speed of seven and five tenths meters per second (7.5 m/s) and a torque or thrust of two and nine tenths kilonewtons (2.9 kN), the duct pressure would be actuated by the controller 32 to two and fifty-five hundredths kilopascals (2.55 kPa) and the pitch of the blades 14 would be actuated by the controller 32 to zero degrees (0°). At a second time interval, the controller 32 may then receive measured values from the instruments 30 including a generator power of eighteen and two tenths kilowatts (18.2 kW), a wind speed of nine and five tenths meters per second (9.5 m/s) and a torque or thrust of three and three tenths kilonewtons (3.3 kN), the duct pressure would be actuated by the controller 32 to two and forty-two kilopascals (2.42 kPa) and the pitch of the blades 14 would be actuated by the controller 32 to sixty-three hundredths degrees (0.63°). The sample wind turbine 10 is shown as an example only and is not meant to be limiting. For example, the sample wind turbine 10 is not limited to the above-described sensors 30 and may utilize nearly any number of different sensors 30, as was described above. In addition, the sample wind turbine 10 is not limited to twenty kilowatt configurations or to the inclusion of the pitch control system 34.

Those skilled in the art will appreciate that changes could be made to the embodiment described above without departing from the broad inventive concept thereof. It is understood, therefore, that this invention is not limited to the particular embodiment disclosed, but is intended to cover modifications within the spirit and scope of the present invention as defined by the appended claims.

What is claimed is:

1. An advanced aerodynamic control system for a wind turbine including a drive shaft and a blade, the drive shaft and blade being rotatable about a drive shaft axis, the control system for measuring operating data and adjusting wind turbine parameters to control the extraction of power from the wind turbine at specific wind speeds, the control system comprising:

an air control system, the air control system being coupled to a duct that extends from a position adjacent a first end of the blade toward a second end of the blade, at least one slot extending along a portion of a surface of the blade, the slot being in communication with the duct;

at least one instrument for measuring the operating data; and a controller that collects the operating data and compares the operating data to predetermined operating norms, the controller actuating the air control system to urge pressurized air into the duct and out of the at least one slot at a variable air flow rate based upon the comparison between the operating data and predetermined operating norms to control the extraction of power from the wind flowing through a swept area of the wind turbine.

2. The control system for a wind turbine of claim 1 further comprising:
a pitch control system coupled to the blade and the controller, the pitch control system altering a pitch of the blade based upon signals from the controller.

3. The control system for a wind turbine of claim 2 wherein the pitch control system alters the pitch of the blade by rotating at least a portion of the blade about a blade axis.

4. The control system for a wind turbine of claim 1 wherein the air control system includes an air flow control mechanism that is actuated by the controller to control at least one of the air flow rate into the duct, the air pressure in the duct and the air flow rate out of the at least one slot.

5. The control system for a wind turbine of claim 1 wherein the at least one slot extends along the surface of the blade generally parallel to a trailing edge of the blade.

6. The control system for a wind turbine of claim 5 wherein the at least one slot is located on an outer eighty percent of the length of the blade.

7. The control system for a wind turbine of claim 6 wherein the at least one slot is located on an outer fifty percent of the length of the blade.

8. The control system for a wind turbine of claim 1 wherein the at least one slot extends along the surface of the blade generally parallel to a leading edge of the blade.

9. The control system for a wind turbine of claim 1 wherein the at least one instrument is selected from the group consisting of a strain sensor, a tachometer, a pressure sensor, an anemometer, a thermometer, a flow sensor, a position indicator, a barometer, a vibration gauge, a torque sensor, a power measuring device and an accelerometer.

10. The control system for a wind turbine of claim 1 further including at least a first blade and a second blade, the first blade including a first duct and a first slot, the second blade including a second duct and a second slot, the controller actuating the air control system to supply a first flow rate of air to the first duct and a second flow rate of air to the second duct, the first flow rate being different than the second flow rate.

11. The control system for a wind turbine of claim 1, wherein a width of the at least one slot is variable along a length of the slot.

12. A control system for a wind turbine for measuring operating data and adjusting system inputs to regulate energy output and/or structural loads of the wind turbine at predetermined operating wind conditions, the control system for a wind turbine comprising:
at least one wind turbine blade including a first end, a second end and a duct extending from a position adjacent the first end toward the second end, at least one slot in communication with the duct and extending along a surface of the blade opposite the first end of the blade;
at least one instrument coupled to the wind turbine that measures the operating data;
a controller coupled to the at least one instrument;
an air control system coupled to the controller that introduces pressurized air into the duct and varies a flow rate of air out of the at least one slot; and
a pitch control system coupled to the blade and the controller that varies a pitch of the blade relative to a wind, wherein the controller collects the operating data from the at least one instrument and compares the operating data to predetermined operating norms, the controller actuating the air control system and pitch control system based upon the comparison of the operating data and predetermined operating norms.

13. The control system for a wind turbine of claim 12 wherein the pitch control system alters the pitch of the blade by rotating at least a portion of the blade about a blade axis.

14. The control system for a wind turbine of claim 12 wherein the air control system includes an air flow control mechanism that is actuated by the controller to control the air flow rate into the duct and out of the at least one slot.

15. The control system for a wind turbine of claim 14 wherein the at least one slot is positioned on the blade generally parallel to a leading edge of the blade.

16. The control system for a wind turbine of claim 12 wherein the at least one slot is positioned on the blade generally parallel to a trailing edge of the blade.

* * * * *